Feb. 10, 1942.   R. H. DYER   2,272,968
APPARATUS FOR WELDING METAL
Filed Sept. 11, 1940   5 Sheets-Sheet 2
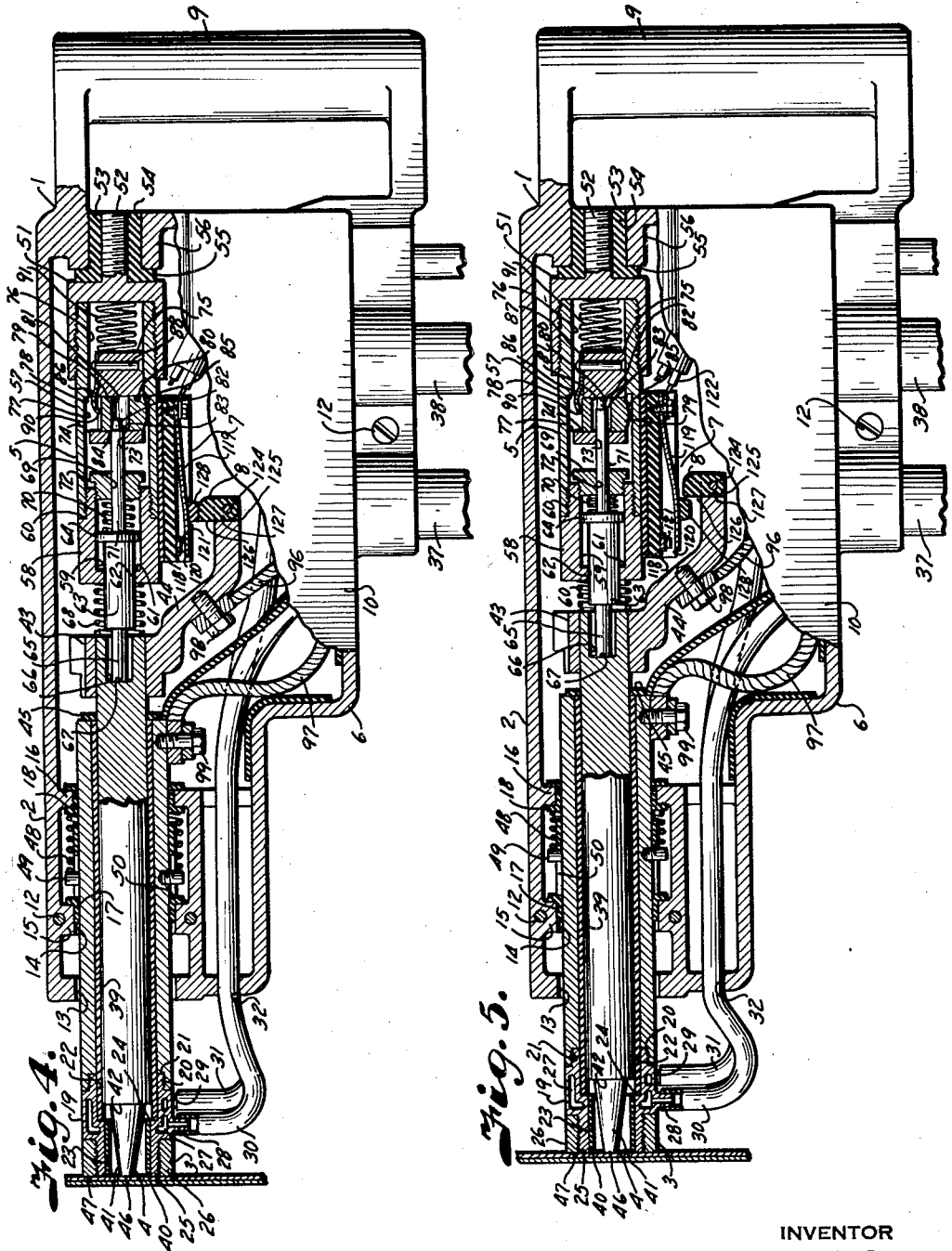
INVENTOR
Rex H. Dyer
BY
ATTORNEY Feb. 10, 1942.   R. H. DYER   2,272,968
APPARATUS FOR WELDING METAL
Filed Sept. 11, 1940   5 Sheets-Sheet 3
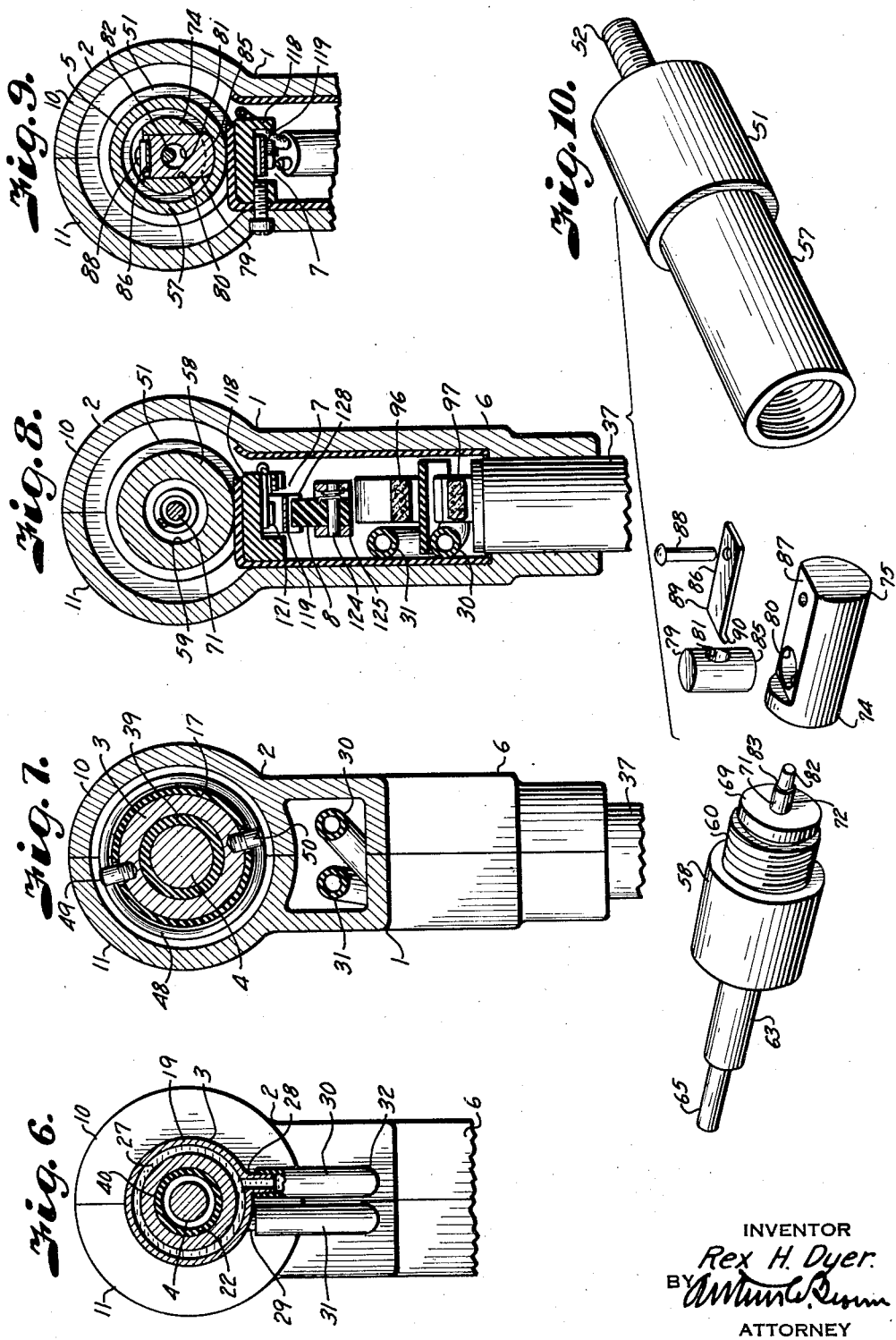
INVENTOR
Rex H. Dyer.
BY
ATTORNEY Feb. 10, 1942. R. H. DYER 2,272,968
APPARATUS FOR WELDING METAL
Filed Sept. 11, 1940 5 Sheets-Sheet 4
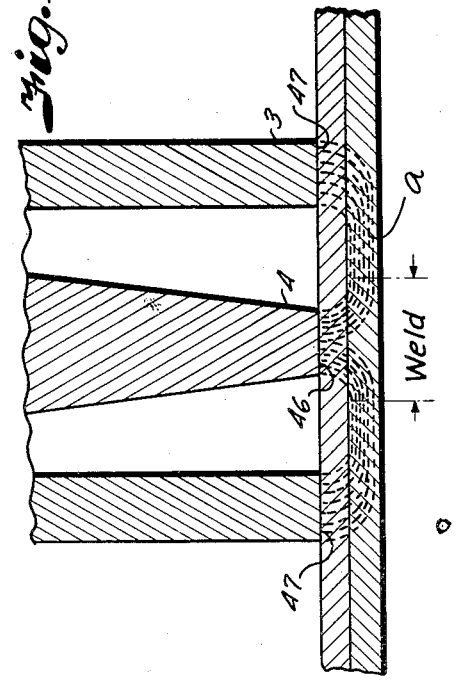
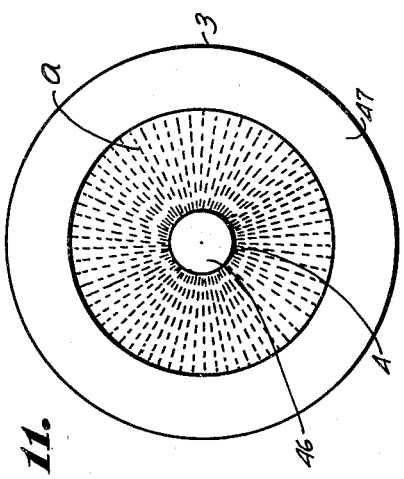
INVENTOR
Rex H. Dyer.
BY
ATTORNEY

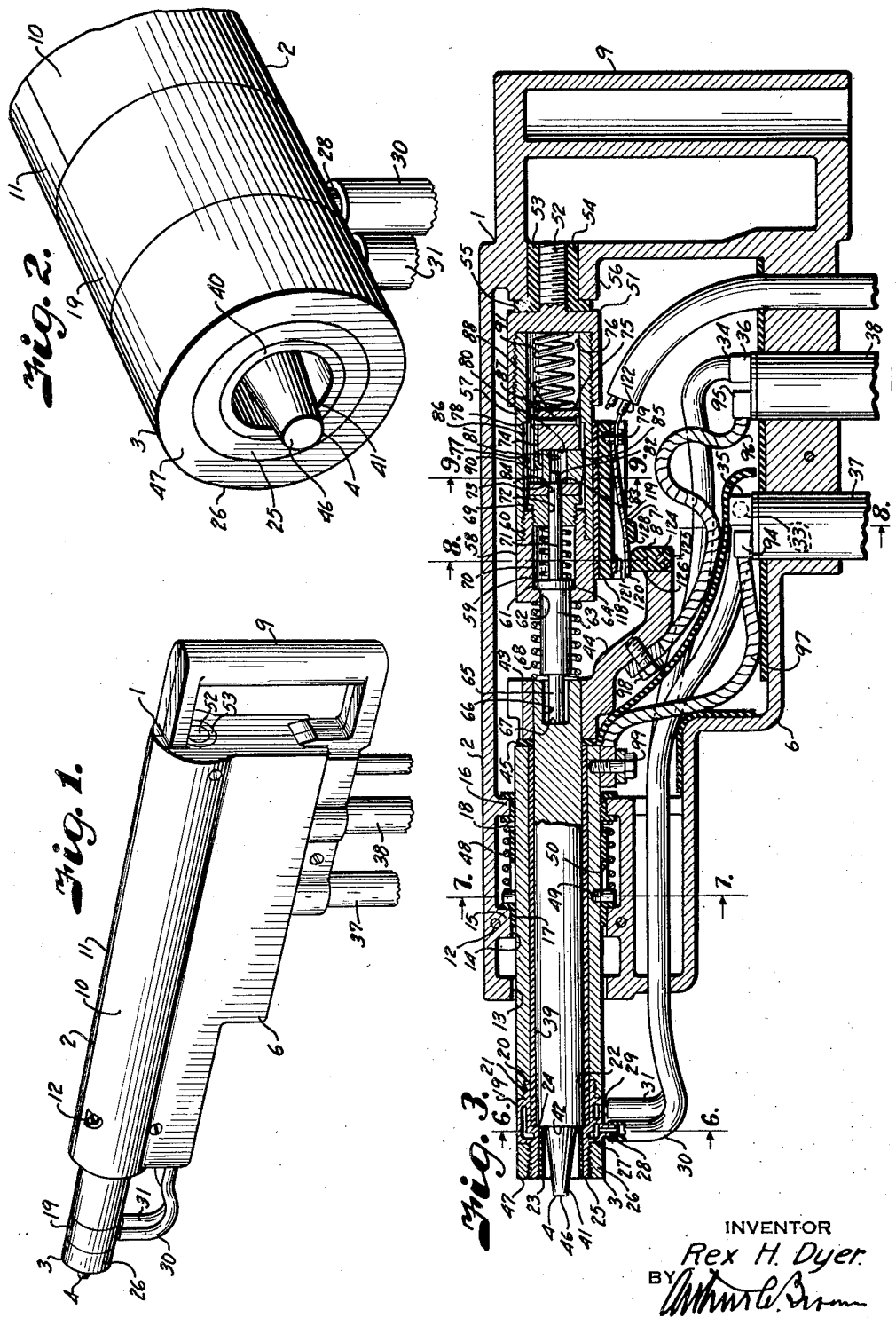

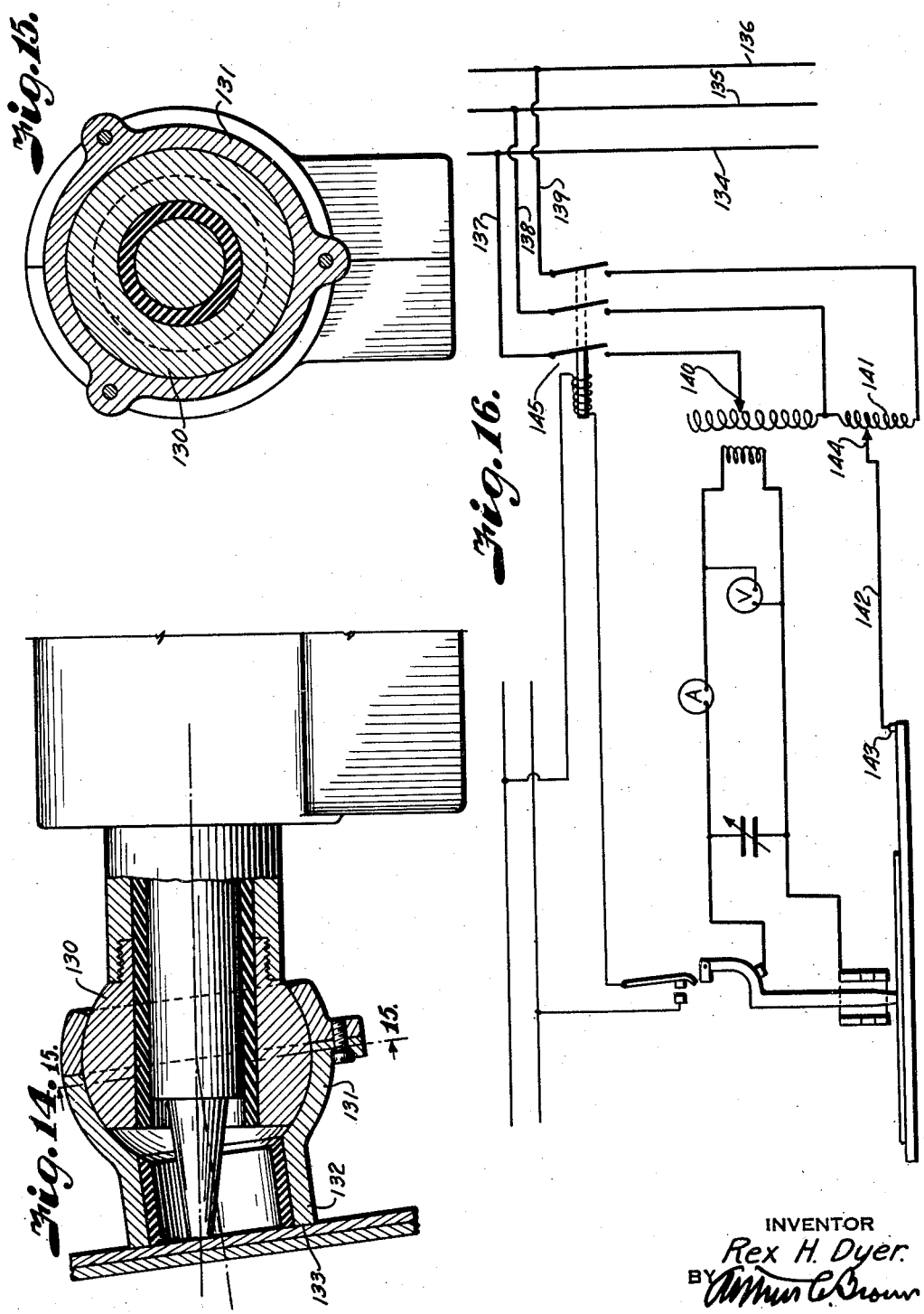

Patented Feb. 10, 1942

2,272,968

UNITED STATES PATENT OFFICE 2,272,968

APPARATUS FOR WELDING METAL

Rex H. Dyer, Kansas City, Mo., assignor to Percussion Welder Corporation, Kansas City, Mo., a corporation of Missouri Application September 11, 1940, Serial No. 356,362

7 Claims. (Cl. 219—4)

This invention relates to apparatus for electrically welding metal, and has for its principal object to effect a weld through passage of an electrical current from the face side of a work piece and to effect penetration of the current through the part which is to be weldingly connected therewith whereby the entire welding operation may be effected exteriorly of an assembled or partly assembled structure.

Another object of the invention is to provide means for striking the metal with a hammer-like blow at the time of the weld to bring the parts into firm contact and improve texture and strength of the weld.

Further objects of the invention are to provide means for effecting a surge of the welding current and intensifying the voltage thereof subsequent to initial heating of the metal to be welded; to provide means for choking the current flow through one of the electrodes whereby the welding heat is concentrated at the contact and striking point of the other electrode; to provide electrodes that are self-adjusting relatively to the work; to provide means for cooling the electrodes; and to provide a simple control mechanism for latching and tripping the percussion device utilized in effecting the hammer-like blow at the time of the weld.

In accomplishing these and other objects of the invention, I have provided improved details of structure, the preferred form of which is illustrated in the accompanying drawings, wherein:

Fig. 1 is a perpective view of a portable hand welder constructed in accordance with the present invention and adapted for carrying out my improved method of welding.

Fig. 2 is an enlarged detail perspective view of the electrodes.

Fig. 3 is a longitudinal section through the welder showing the electrodes, the percussion device or hammer parts, and control switch in their normal non-welding positions.

Fig. 4 is a similar view, partly in elevation, showing the electrodes applied to the work, and the hammer being moved from cocked toward tripping position, the current control switch being in closed position.

Fig. 5 is a similar view showing the switch open and the percussion device tripped to effect impact of the heated weld.

Fig. 6 is a cross-section through the electrodes on the line 6—6 of Fig. 3, particularly illustrating cooling thereof.

Fig. 7 is a cross-section through the barrel of the welder on the line 7—7 of Fig. 3.

Fig. 8 is a cross-section on the line 8—8 of Fig. 3.

Fig. 9 is a cross-section on the line 9—9 of Fig. 3.

Fig. 10 is a detail perspective view of the parts of the percussion mechanism in disassembled spaced relation.

Fig. 11 is a diagrammatic view of the ends of the electrodes showing the path of the current therebetween.

Fig. 12 is a section through the electrodes and work piece showing the passage of the current.

Fig. 13 is a diagrammatic view of the electric circuits supplying a welding current to the welder.

Fig. 14 is a partial section through a modified form of electrodes.

Fig. 15 is a cross-section through the modified form of electrodes on the line 15—15 of Fig. 14.

Fig. 16 is a digrammatic view of a modified form of circuit wiring.

Referring more in detail to the drawings:

I designates a welder embodying the features of the present invention and adapted for welding in accordance with my improved method. The welder illustrated is of portable, hand-operated type, and is especially adapted for welding of assembled or partly assembled structures. The welder is of pistol shape and includes a substantially cylindrical shaped barrel 2 supporting electrodes 3—4 and a percussion or hammer mechanism 5. Depending from the barrel 2 is a stock 6 for housing a control switch 7, a switch operating toggle 8, and the electrical connections for supplying welding current to the electrodes as later described. The welder also includes a handle grip 9 for manipulation thereof and effecting pressure of the electrodes against the work for automatically closing the switch and cocking and tripping the percussion mechanism when effecting a weld, as later described.

The barrel 2, stock 6, and handle grip 9 are preferably formed by mating sections 10 and 11 that are secured together by fastening devices such as screws 12 extending through one of the sections and threadedly engaging the other. Formed in the forward end of the barrel 2 is a bore 13, coaxially aligning with bores 14 formed in spaced, inwardly extending partitions 15 or 16, the latter bores being bushed by suitable insulating material 17 and 18 to insulate the electrodes that are slidably carried therein, as clearly shown in Fig. 3, the electrode 3 preferably comprising an outer, sleeve-like member that is snugly slidable in the bushings and which extends freely through the bore 13 to carry a head 19 formed of a material having higher resistance than the body of the electrode and having a threaded neck 20 engaging a threaded counterbore 21 in the outer end of the sleeve. The neck, including the adjacent portion of the head, has a bore 22, corresponding to the bore of the sleeve, and which cooperates with a smaller coaxial bore 23 to form an intermediate stop shoulder 24. The bore 23 extends through a reduced threaded terminal 25 on the forward portion of the head and threaded thereon is a ring 26 having substantially the same circumference as that of the head and sleeve. The head of the electrode is provided with a circumferential passageway 27 having inlet and outlet connections 28 and 29 with hose 30 and 31 which preferably lead through openings 32 in the forward end of the stock 6 to connect as at 33 and 34 with ducts 35 and 36 carried by the current conducting cables 27 and 38. A cooling medium, such as water, may be circulated through one of the ducts and the hose connected therewith through the passageway and returned through the hose to the other duct for cooling the electrodes and maintaining a desired temperature. The opposite end of the electrode projects within the portion of the barrel carrying the percussion mechanism as shown in Fig. 3.

The sleeve electrode 3 is lined with an insulating tube 39, and the bore portion 23 of the head 19 is lined with an insulating tube 40 that engages the forward end of the tube 39 to insulate the plunger electrode 4 which is slidably mounted therein. The plunger electrode 4 has a reduced terminal 41 at its forward end to form a shoulder 42 which normally seats against the insulating tube 40 and the opposite end projects from the sleeve electrode to mount a collar 43 carrying a depending rearwardly extending arm 44. The collar 43 is insulated from the end of the sleeve electrode by an insulating washer 45. The electrode tip 41 is of substantially conical form and projects freely through the insulating tube to form a contact face 46 in spaced relation with the annular contact face 47 of the outer electrode when the electrodes are in the position shown in Fig. 3. The sleeve electrode is normally retained in projected position by a coil spring 48 that is sleeved over the insulating bushing 17 and has one end bearing against the bushing 18 and the other against pins 49 that are carried by the sleeve electrode and operating in slots 50 formed in the insulating bushing as clearly shown in Fig. 3.

The percussion mechanism 5 is carried by a socket member 51 that has a reduced threaded stud 52 threadedly engaged in an insulating bushing 53 which is mounted in an opening 54 formed in the end walls of the sections 10 and 11, the insulating bushing 53 being provided with a flange 55 to space the socket member from the boss 56 surrounding the opening 54. The socket member 51 is interiorly threaded to mount a cylindrical hammer guide 57 which projects toward the electrodes and has its forward end carrying a cap 58. The cap 58 has a socket-like bore 59 extending forwardly through a reduced threaded neck 60 which threads into the forward end of the guide 57. The bore 59 terminates short of the forward end to provide a stop shoulder 61 circumferentially of an axial opening 62 in which is supported a drift 63 having a flange-like head 64 slidable within the socket-like bore 59 and adapted to engage the shoulder 61. The forward end of the drift has a pilot 65 that engages in a socket 66 formed in the rear end of the plunger electrode, the pilot 65 engaging directly against the bottom 67 of the socket.

The plunger electrode is retained in projected position by a coil spring 68 sleeved over the drift 63 and having one end bearing against the cap 58 and its other end against the end of the plunger electrode 4. The bore of the cap is closed by a bushing 69 that is threaded therein to engage a spring 70 sleeved over a reduced, rearwardly extending stem 71 of the drift, and has its opposite end engaging against the flange 64 to retain the drift in projected position with the pilot engaging the end of the socket 66. The stem 71 projects through an opening 72 in the bushing and into an opening 73 formed in the forward end of a hammer 74. The hammer 74 is best illustrated in Fig. 10, and includes a cylindrical body 75 of suitable diameter to slidably engage within a reduced bore 76 in the rear end of the guide. The forward end of the hammer is supportingly retained on the stem 71 and is carried in an enlarged bore 77 of the guide which cooperates with the rear bore to form an annular shoulder 78 which trips the latch mechanism, now to be described.

The latch includes a substantially cylindrical bolt 79 that is reciprocably mounted in a transverse bore 80 of the hammer 74, and which intersects the opening 73 so that the stem of the drift extends within the bore 80 into an opening 81 of the bolt 79. Formed on the rear end of the stem 71 is a reduced pilot 82 to provide an annular shoulder 83 that is adapted to normally engage against the upper edge 84 of the bore 80 in one position of the bolt where a slightly rounded end 85 thereof is engaged with the wall of the enlarged bore of the guide tube as shown in Fig. 3. The bolt is normally retained in this position by a leaf spring 86 fixed to a flattened face 87 of the bolt by a fastening device, such as a rivet 88. The forward end 89 of the spring has a lip 90 which extends within the upper end of the bore 80 and engages the upper end of the bolt to yieldingly retain the bolt in the position shown in Fig. 3, with the shoulder 83 of the drift in latching engagement with the edge 84 of the bolt. The hammer is normally retained in forwardly projected position by a coil spring 91 having one end engaging against the bottom of the socket member 51 and its other end engaging against the rear end of the hammer 74.

Current is delivered to the electrodes through conductors 92 and 93 positioned within the cables 37 and 38 and having terminals 94 and 95 connected by flexible leads 96 and 97 with the arm 44 of the plunger electrode and with the sleeve electrode respectively, the flexible connections being secured to the respective electrodes by fastening devices, such as cap-screws 98 and 99. The conductors are connected with a secondary winding 100 of a current transformer 101 which includes a primary winding 102 supplied with a suitable current through conductors 103 and 104 from a current supply service comprising the line wires 105 and 106. Inserted in the conductor 104 is a magnetically actuated relay switch 107 to automatically make and break circuit with the primary of the transformer. The conductor 104 is connected with the primary of the transformer by a contact arm 108 engageable with one of the taps of the secondary whereby the induced current in the secondary is selectively regulated to provide the proper welding current, as indicated by the ammeter 109 which is inserted in the conductor 93 and the voltameter 110 which is connected across the conductors 92 and 93 as clearly shown in Fig. 3.

The switch 107 includes an electromagnet 111 having a winding 112 connected by conductors 113 and 114 with a low voltage circuit supplied through the line wires 115 and 116. The circuit to the electric winding is automatically controlled by the switch 7.

This switch includes an insulating block 118 that is fastened on the under side of the hammer guide and carries a leaf spring switch arm 119, having a contact 120 adapted to engage a contact 121 fixed on the forward end of the block 118. The spring contact is connected with the control circuit by a terminal 122 and the fixed contact is connected in a similar manner. The switch arm is moved into engagement with the fixed contact by the toggle 8 which is pivotally mounted on a pin 124 carried by a yoke-shaped end 125 of the arm 44. The toggle 8 is preferably formed of insulating material and has a flat forward face 126 adapted to engage a stop face 127 of the arm 44 by pressure of a spring 8' when the electrodes move in one direction and to swing away from the stop 127 against action of the spring 8' when the electrodes move in the opposite direction. The toggle 8 projects upwardly above the arm and is engaged by an insulating block 128 carried by the switch arm 119 as shown in Figs. 3 to 5 inclusive.

In order to produce a surge in the current and increase the voltage at the time a weld is effected, the conductors 92 and 93 are connected by a condenser 129.

The plunger electrode shown in Figs. 14 and 15 is substantially the same as that of the first form. However, the sleeve electrode carries a ball 130 to which a socket 131 is connected to universally carry the contact terminal 132. With this arrangement the work contact face 133 of the terminal 132 automatically adjusts itself to the work so that it engages around the entire periphery thereof.

Fig. 16 illustrates a three-phase circuit for supplying current to the welder. In this instance the three line wires 134, 135 and 136 are connected by conductors 137, 138 and 139, the conductor 137 being connected with the adjustable contact 140 of the transformer, and the conductor 138 with one of the end terminals of the primary and with a resistance winding 141 that is connected with the conductor 139. The primary of the transformer thus operates in exactly the same manner as the primary previously described. However, 110 volts are applied across the resistance element 141 to supply a ground potential to the work piece through the conductor 142, the conductor 142 being connected by a suitable clamp indicated at 143. In order to vary the voltage of the ground circuit, the conductor 142 is connected with a contact 144 which is adapted to be adjusted along the resistance 141. The ground circuit, being connected with the part of the work which is to be welded to the part engaged by the electrodes of the welder, reduces tendency of the current to flow directly across the electrodes and the welding current is caused to penetrate the upper plate and into the lower plates a greater distance to heat the metal to a welding temperature prior to striking of the hammer-like blow. In all other respects, the circuit is the same as that previously described, except that a three-pole relay switch 145 is necessary to control flow of current through the conductors 137, 138 and 139.

In using a welder constructed and assembled as described, it is held by the handle 9 and stock, and the work contact face of the plunger electrode is brought into contact with the point of the work pieces to be welded together. Pressure is then applied so that the sleeve electrode and supporting housing move forwardly against action of the spring 68 until the annular work contact face of the sleeve electrode engages the work, whereupon the housing then moves forwardly relatively to both electrodes against action of all the springs. Since the bottom 67 of the socket 66 engages the end of the pilot 65 and since the leaf spring 86 is retaining the bolt 79 against the inner face of the hammer guide, the edge 84 is engaged by the annular shoulder 83 of the drift and the drift 63 holds the hammer to compress and load the spring 70. As soon as the toggle lever 123 is engaged by the block 128, the switch arm 119 is moved into circuit closing position relatively to the fixed contact 121 to close the circuit to the relay switch 107, thereby energizing the winding of the electromagnet 111 and causing the switch to close the primary circuit of the transformer. A secondary current is then induced in the secondary winding 100 so that a welding current is completed through the work pieces to be welded together by way of the conductor 93, flexible lead 96, arm 44, collar 43, plunger electrode 4, and through the work contacting face 46, across the upper plate of the work and through the lower plate where it flows toward the annular work contact face of the sleeve electrode to heat the metal to welding temperature, the path of the current being indicated by the dotted lines a shown in Figs. 11 and 12.

Owing to the fact that the head of the sleeve electrode is of higher resistance than that of the head of the plunger electrode, the flow of current is, in effect, partially blocked, and forced deeply through the metal so that both plates are effectively heated. The major or highest heat is concentrated under the contact face of the plunger electrode and the weld takes place at this point. During initial energization of the primary circuit, the condenser 129 is loaded. During heating of the metal the relative movement of the housing continues because of the applied pressure and the rounded end 85 of the bolt 79 soon rides over the shoulder 78 into the smaller portion of the bore. This movement causes the bolt to move upwardly so that the latch edge 84 thereof disengages from the shoulder of the drift, whereupon the hammer spring is effective to forcibly move the hammer into contact with the drift, imparting a hammer-like blow through the drift and the plunger electrode onto the work. This blow, being struck immediately after heating of the metal, brings the parts to be welded into contact and compensates for any irregularity in the metal that tends to hold them apart. The hammer-like blow also causes impaction of the heated metal and improves the strength and texture of the weld. At the time the hammer is being rendered effective, or while it is being moved into contact with the drift, the toggle lever rides off the insulation block 128 to open the circuit, thereby interrupting flow of welding current through the electrodes, and since the electrodes are still in contact with the metal the condenser unloads to effect a current surge through the metal. This may be timed to occur just prior to actuation of the hammer, or at the time the hammer is effective.

When the welder is removed from contact with the work, the springs restore the electrodes to their original position with relation to the housing and during this movement the toggle 8 swings retractively against action of its spring 8' so as to avoid closure of the switch 7 when the electrodes are being disengaged from the work. The device may then be moved to another welding position and another weld effected on the work in the same manner as above described. Since the spacing between the plunger electrode and the sleeve electrode remains constant, all portions of the work will have the same resistance to the welding current, and consequently the welds are uniform anywhere over the work.

It is obvious that with a welder constructed as described a weld can be made completely from the outside of an assembled or partly assembled structure.

What I claim and desire to secure by Letters Patent is:

1. A welding apparatus including, an electrode support, a pair of electrodes carried by the support and having movement relative to the support when pressure is applied to the electrodes through the support to bring said electrodes into engagement with the work to be welded and to effect movement of the support relative to the electrodes, a current supply connected with the electrodes, a switch controlling flow of current to the electrodes, means connecting the switch with one of the electrodes for effecting closure of the switch upon movement of the support in bringing said electrodes into contact with the work, a percussion means carried by the support and engageable with one of the electrodes, and means for energizing the percussion means responsive to movement of the support in bringing said electrodes into contact with the work for striking the work subsequent to closure of the switch.

2. A welding apparatus including, an electrode support, a pair of electrodes carried by the support and having successive movement relative to the support when pressure is applied to the electrodes through the support to bring said electrodes successively into engagement with the work to be welded and to effect movement of the support relatively to the electrodes, a current supply connected with the electrodes, a switch controlling flow of current to the electrodes, means connecting the switch with the first electrode to contact the work for effecting closure of the switch upon movement of the support in bringing the other electrode into contact with the work, percussion means carried by the support and engageable with one of the electrodes, and means for energizing the percussion means responsive to movement of the support relatively to said electrodes for striking the work subsequent to closure of the switch.

3. A welding apparatus including, a support, a pair of electrodes carried by the support and having successive movement relative to the support when pressure is applied to the electrodes through the support to bring the electrodes successively into engagement with the work to be welded and to effect movement of the support relatively to the electrodes, means supplying current to the electrodes including a switch for controlling flow of current, means connecting the switch with the first electrode to contact the work to effect closure of the switch upon movement of the support in bringing the other electrode into contact with the work, a spring-loaded hammer carried by the support for effecting a hammer-like blow on one of the electrodes, latch means engageable with the hammer upon movement of the support relatively to the electrodes to load said spring, and means for releasing the hammer against action of its loading spring subsequent to closing of said switch.

4. A welding apparatus including, a support, a pair of electrodes carried by the support and having successive movement relative to the support when pressure is applied to the electrodes through the support to bring the electrodes successively into engagement with the work to be welded and to effect movement of the support relatively to the electrodes, means supplying current to the electrodes including a switch for controlling flow of current, means connecting the switch with the first electrode to contact the work to effect closure of the switch upon movement of the support in bringing the other electrode into contact with the work, a hammer carried by the support, a drift intermediate the hammer and one of the electrodes, a latch connecting the drift with the hammer upon movement of the support relatively to the electrodes, a spring carried by the support for driving the hammer and loaded responsive to said movement of the support, and means arranged to release the hammer from propelling influence of the drift to effect a blow of the hammer on said electrode responsive to unloading said spring.

5. A welding apparatus including, an electrode support, a pair of electrodes carried by the support and having successive movement relative to the support when pressure is applied to the electrodes through the support to bring said electrodes successively into engagement with the work to be welded and to effect movement of the support relatively to the electrodes, a switch carried by the support, means supplying current to the electrodes through said switch, means connecting the switch with the first electrode to contact the work to effect closure of the switch upon movement of the support in bringing the other electrode into contact with the work, a hammer guide carried by the support in axial alignment with the electrodes, a hammer slidable in the guide, a spring urging the hammer in the direction of the electrodes, a drift intermediate the hammer and one of the electrodes and having latch connection with the hammer to effect loading of the hammer spring upon movement of the support relatively to the electrodes, and means for tripping said latch connection responsive to final movement of said support for effecting a hammer blow on the electrode through said drift.

6. A welding apparatus including an electrode support, a tubular electrode movably carried in the support, a rod-like electrode movable within the tubular electrode, compression springs retaining said electrodes in projected position with respect to the electrode support and yieldable when pressure is applied to the support for bringing said electrodes into successive engagement with work to be welded and relative movement of the support on the electrodes, percussion means carried by the support in axial alignment with the electrodes, means actuated by the movement of the support for energizing the percussion means during initial movement of the support and for releasing the percussion means to strike a blow on the work during final movement of the support, and means supplying an electric current to the electrodes, said means also being activated responsive to initial movement of the support and prior to release of the percussion means.

7. A welding apparatus including an electrode housing, a tubular electrode movably carried in the housing, a rod-like electrode movable within the tubular electrode, compression springs yieldingly retaining said electrodes in projected position with respect to the housing whereby pressure on the housing brings said electrodes into successive engagement with work to be welded and relative movement of the housing on the electrodes, a hammer guide carried in the housing in axial alignment with the electrodes, a hammer slidable in the guide, a spring urging the hammer in the direction of the electrodes, a bolt carried by the hammer and having a bore axial with the guide, a drift provided with a stem slidable in the bore and having a shoulder on said stem engaging the bolt to effect loading of the hammer spring when the housing is moved relatively to the electrodes, means for releasing said bolt from the shoulder to release the hammer against action of the hammer spring, and means supplying an electric current to the electrodes, said means being activated responsive to initial movement of the housing relatively to the rod-like electrode.

REX H. DYER.